UNITED STATES PATENT OFFICE.

WILLIAM MORRISON, OF CHICAGO, ILLINOIS.

STORAGE-BATTERY SEPARATOR.

1,262,228.      Specification of Letters Patent.      Patented Apr. 9, 1918.

No Drawing.      Application filed February 20, 1918.   Serial No. 218,337.

*To all whom it may concern:*

Be it known that I, WILLIAM MORRISON, a citizen of the United States, residing at Chicago, in the county of Cook and State of Illinois, have invented certain new and useful Improvements in Storage - Battery Separators, of which the following is a specification.

In my prior Patent No. 1,228,368, patented May 29, 1917, I have described and claimed a wood separator for storage battery plates, this separator consisting of a sheet of wood impregnated with barium sulfate. According to the preferred method of preparing the separator, as disclosed in the said patent, the sheet or plate of wood is immersed in a hot solution of barium hydroxid and allowed to remain therein until thorough penetration has taken place. The plate is then transferred to a sulfate solution, such as a sulfuric acid solution, whereby barium sulfate is precipitated in the pores of the wood. After washing with water the impregnated plate is ready for use. The effect of this treatment is to correct the excessive porosity of wood separators, and thereby to prevent the occurrence of "treeing," that is, the formation of conductive filaments extending between the electrodes and tending to short circuit the battery.

According to the present application a like treatment is applied to the betterment or improvement, for the specific purpose of their use as storage battery separators, of non-ligneous materials in plate or sheet form. More specifically, the treatment is applied to sheets composed wholly or in part of a mineral fiber, such as asbestos cloth, asbestos board and asbestos compositions in general.

The impregnation of such non-ligneous sheets may be carried out in the manner described in my prior patent above referred to, and as hereinabove indicated. In the case of highly porous sheets the treatment including the impregnation with barium hydroxid and the precipitation of barium sulfate may be repeated one or more times as may be necessary to accomplish such reduction of the originally excessive porosity as will effectually prevent "treeing" of the battery under conditions of use.

The plates prepared as above and comprising asbestos or asbestos compositions impregnated with barium sulfate are more durable than wooden plates similarly prepared, under the conditions of actual use in storage batteries.

In claim:—

1. A separator for storage batteries, comprising a porous sheet of non-ligneous material impregnated with barium sulfate.

2. A separator for storage batteries, consisting of an asbestos sheet impregnated with barium sulfate.

3. In combination with the positive and negative electrodes of a storage battery, a separator therefor comprising a porous sheet of non-ligneous material impregnated with barium sulfate.

4. In combination with the positive and negative electrodes of a storage battery, a separator therefor comprising a porous sheet of asbestos impregnated with barium sulfate.

In testimony whereof, I affix my signature.

WILLIAM MORRISON.